US011835155B2

(12) United States Patent
Rozputniak et al.

(10) Patent No.: US 11,835,155 B2
(45) Date of Patent: Dec. 5, 2023

(54) SEAL ASSEMBLY AND FLUID VALVE

(71) Applicant: Vitesco Technologies GmbH, Hannover (DE)

(72) Inventors: Dmytro Rozputniak, Munich (DE); George Plaeru, Munich (DE); Alexandru-Llie Isaincu, Munich (DE); Alexandru Popa, Munich (DE)

(73) Assignee: VITESCO TECHNOLOGIES GMBH, Hannover (DE)

( * ) Notice: Subject to any disclaimer, the term of this patent is extended or adjusted under 35 U.S.C. 154(b) by 61 days.

(21) Appl. No.: 17/605,056

(22) PCT Filed: Apr. 7, 2020

(86) PCT No.: PCT/EP2020/059864
§ 371 (c)(1),
(2) Date: Oct. 20, 2021

(87) PCT Pub. No.: WO2020/216609
PCT Pub. Date: Oct. 29, 2020

(65) Prior Publication Data
US 2022/0196153 A1    Jun. 23, 2022

(30) Foreign Application Priority Data
Apr. 23, 2019   (EP) .................... 19465530

(51) Int. Cl.
*F16K 5/06*      (2006.01)
*F16J 15/02*     (2006.01)
(Continued)

(52) U.S. Cl.
CPC ........... *F16K 5/0678* (2013.01); *F16J 15/021* (2013.01); *F16J 15/3268* (2013.01);
(Continued)

(58) Field of Classification Search
CPC ...... F16K 5/0678; F16K 5/0689; F16K 5/201; F16K 11/0873; F01P 7/14;
(Continued)

(56) References Cited

U.S. PATENT DOCUMENTS 2,983,533 A * 5/1961 Tisch .................. F16J 15/32
277/649
4,217,923 A * 8/1980 Kindersley ........... F16K 5/0636
137/315.21
(Continued)

FOREIGN PATENT DOCUMENTS

DE      34 37 247     4/1986
DE      4115115 A1    3/1992
(Continued)

OTHER PUBLICATIONS

International Search Report dated Dec. 18, 2019 in corresponding PCT Application PCT/EP2020/059864 on.
(Continued)

*Primary Examiner* — David Colon-Morales
(74) *Attorney, Agent, or Firm* — Cozen O'Connor

(57) ABSTRACT

A seal arrangement for a fluid valve has: a first sealing element configured to bear sealingly against a valve housing of the fluid valve; a second sealing element configured to bear sealingly against an adjustable, rotatable, valve body of the fluid valve; and an elastically deformable intermediate piece arranged, axially, between a first wall of the first sealing element, which faces the second sealing element, and a second wall of the second sealing element, which faces the first sealing element, so as to elastically space apart the first and second sealing elements. In at least one axial portion of the intermediate piece, an axial cross section of the intermediate piece has a first radial lateral surface and an opposite second radial lateral surface. The first radial lateral surface is convex and the second radial lateral surface is
(Continued)

concave, planar or less convex than the first radial lateral surface.

12 Claims, 2 Drawing Sheets

(51) Int. Cl.
    *F16J 15/3268*     (2016.01)
    *F16K 11/087*     (2006.01)
    *F01P 7/14*     (2006.01)

(52) U.S. Cl.
    CPC ...... *F16K 5/0689* (2013.01); *F01P 2007/146* (2013.01); *F16K 11/0873* (2013.01)

(58) Field of Classification Search
    CPC ... F01P 2007/146; F16J 15/104; F16J 15/028; F16J 15/021; F16J 15/3268
    See application file for complete search history.

(56) References Cited

U.S. PATENT DOCUMENTS

| | | | | |
|---|---|---|---|---|
| 4,467,751 A * | 8/1984 | Asaka | ...................... | F16J 15/48 123/190.17 |
| 4,968,044 A * | 11/1990 | Petrak | .................. | F16J 15/3456 384/140 |
| 5,626,520 A * | 5/1997 | Mazziotti | .................. | F16D 3/41 464/131 |
| 6,082,707 A * | 7/2000 | Hosie | ...................... | F16K 5/205 251/181 |
| 6,217,003 B1 * | 4/2001 | Shafer | .................. | F16K 5/0673 251/192 |
| 7,243,900 B2 * | 7/2007 | Wang | .................... | F16K 5/0689 251/174 |
| 9,695,734 B2 * | 7/2017 | Carns | .................... | F16K 5/0605 |
| 9,816,625 B2 * | 11/2017 | Warbey | ................. | F16J 15/028 |
| 9,915,359 B2 * | 3/2018 | Ricard | .................. | F16K 5/0673 |
| 10,072,556 B2 * | 9/2018 | Maruyama | ................ | F01P 7/16 |
| 10,295,066 B2 * | 5/2019 | Kaczmar | ............... | F16K 31/041 |
| 10,295,076 B2 * | 5/2019 | Russalian | ................. | F01P 7/16 |
| 10,352,460 B2 * | 7/2019 | Jang | ...................... | F16K 5/0678 |
| 10,358,969 B2 * | 7/2019 | Dutta | ........................ | F03G 7/06 |
| 2014/0319395 A1 | 10/2014 | Warbey | | |
| 2022/0146003 A1 * | 5/2022 | Yu | ....................... | F16K 11/0876 |

FOREIGN PATENT DOCUMENTS

| | | | | |
|---|---|---|---|---|
| DE | 10 2009 014 047 | | 9/2010 | |
| DE | 102009014047 A1 * | | 9/2010 | ............ F16K 3/243 |
| DE | 102015010782 | | 2/2017 | |
| DE | 20 2017 000 564 | | 3/2017 | |
| DE | 10 2017 216 345 | | 3/2019 | |
| JP | S 55-1953 U | | 1/1980 | |
| WO | WO 2016/030505 | | 3/2016 | |
| WO | WO-2016030505 A1 * | | 3/2016 | ............... F16J 15/44 |
| WO | WO-2017145081 A1 * | | 8/2017 | ............ F16K 11/056 |
| WO | WO 2018/108282 | | 6/2018 | |
| WO | WO 2018/185529 | | 10/2018 | |

OTHER PUBLICATIONS

Written Opinion dated Dec. 18, 2019 in corresponding PCT Application PCT/EP2020/059864.
European Search Report issued in corresponding DE Application No. 19465530.4 dated Oct. 9, 2019.
Office Action dated Feb. 4, 2023 issued in Chinese Patent Application No. 202080030957.4.
Office Action dated Aug. 17, 2023 issued in Chinese Patent Application No. 202080030957.4.

* cited by examiner

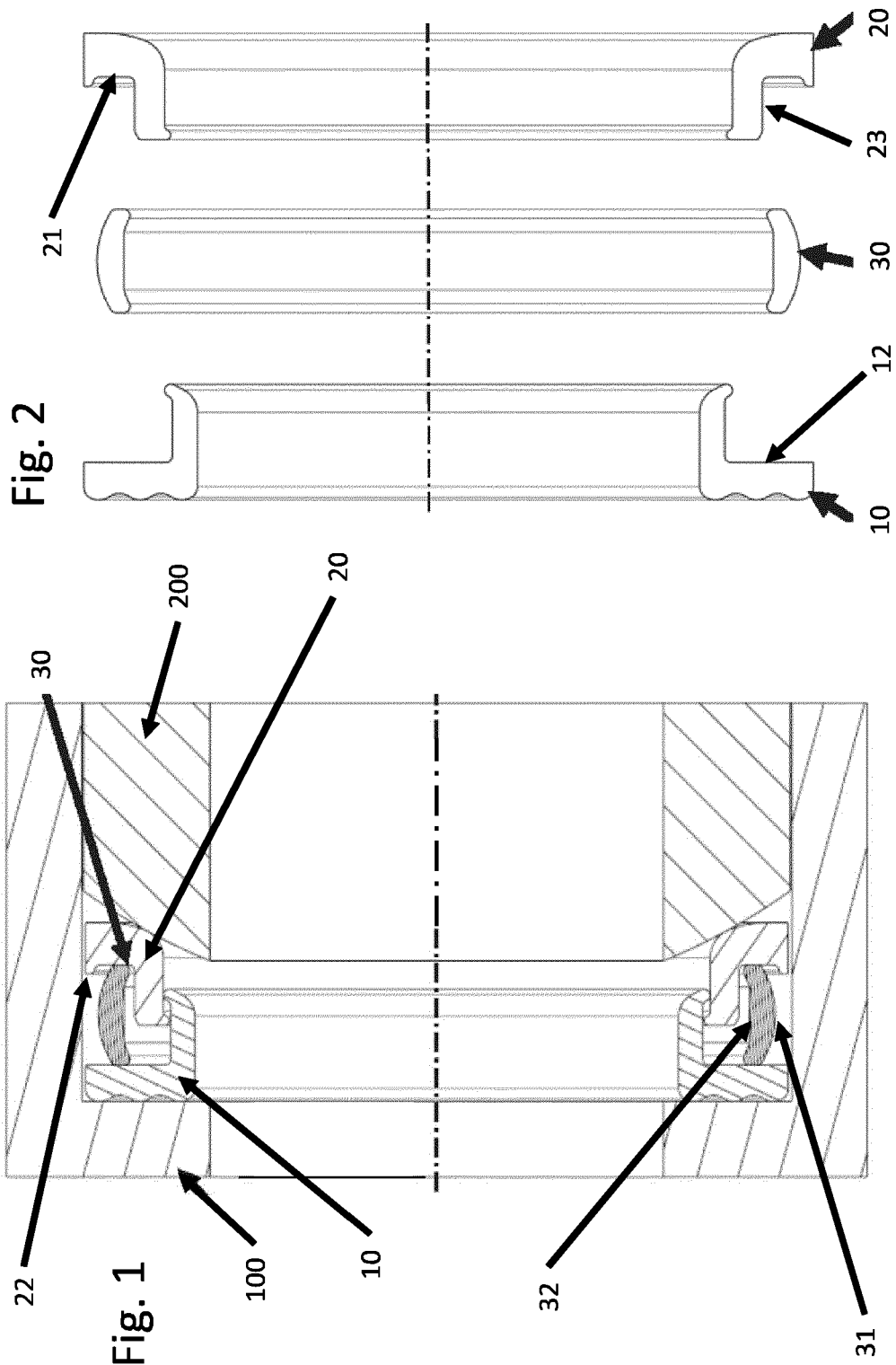

SEAL ASSEMBLY AND FLUID VALVE

CROSS REFERENCE TO RELATED APPLICATIONS

This is a U.S. national stage of International application No. PCT/EP2020/059864, filed on Apr. 7, 2020, which claims priority to European Application No. 19465530.4 filed Apr. 23, 2019, the content of each of which is incorporated herein by reference.

BACKGROUND OF THE INVENTION

1. Field of the Invention

The present invention relates to a seal arrangement for a fluid valve, to a fluid valve having the seal arrangement, to a motor vehicle having the seal arrangement.

SUMMARY OF THE INVENTION

An object of one embodiment of the present invention is to improve sealing between a valve housing and an adjustable, in particular rotatable, valve body.

This object may be achieved by a seal arrangement having at least one seal arrangement described herein, in particular at least one fluid valve described herein, and a method for providing sealing between a valve housing and an adjustable, in particular rotatable, valve body by a seal arrangement described herein, respectively.

According to one embodiment of the present invention, a seal arrangement, which is provided, in particular set up or used, for sealing between a valve housing and a valve body of a fluid valve, the valve body, in one embodiment, being (arranged in an) adjustable (manner), in particular (arranged in a) rotatable (manner), entirely or partially in the valve housing, has a first, separately formed sealing element, which is provided, in particular set up or used, for bearing in a sealing manner against the valve housing of the fluid valve, a second, separately formed sealing element, which is provided, in particular set up or used, for bearing in a sealing manner against the valve body of the fluid valve, and a separately formed, elastically deformable intermediate piece which is arranged in an axial direction between a first wall, facing the second sealing element, of the first sealing element and a second wall, facing the first sealing element, of the second sealing element and which elastically spaces apart the two sealing elements, or is provided, in particular set up or used, for this purpose, wherein, in at least one axial portion of the intermediate piece, the axial portion extending along at least 25%, in particular at least 50%, and in one embodiment at least 75%, of an axial total length of the intermediate piece, an axial cross section of the intermediate piece has a convex first radial lateral surface and an opposite second radial lateral surface, which is concave, planar or less convex than this first radial lateral surface. The convex first lateral surface and/or the concave or less convex second radial lateral surface is, in one embodiment, in each case curved, and in one development, it has a constant radius of curvature.

As a result, in one embodiment, in addition to elastic axial compression, elastic bending of the intermediate piece, which in one embodiment is crescent-shaped in cross section, is also realized.

Thus, in one embodiment, the intermediate piece can be provided with an advantageous stiffness profile or a profile of a reaction force exerted by the intermediate piece via or during the movement of the first and second walls axially toward one another, and as a result in particular tolerances of the fluid valve are compensated at least to some extent. In addition or alternatively, in one embodiment, a sealing action can be improved as a result.

Convex and concave are understood, in one embodiment, in the manner conventional for optical lenses.

In one embodiment, the first sealing element and/or the second sealing element and/or the intermediate piece is/are formed in each case in a ring-like, in particular annular manner.

In addition or alternatively, in one embodiment, the first sealing element and/or the second sealing element and/or the intermediate piece is/are in each case at least partially rotationally symmetric with regard to an axis of symmetry parallel to the axial direction.

As a result, in one embodiment, the sealing action, production and/or assembly can be improved.

In one embodiment, the first radial lateral surface is a radially outer lateral surface, i.e., in particular bulges radially outward, and the second radial lateral surface is a radially inner lateral surface, which, in one embodiment, likewise bulges radially outward, is planar or bulges radially inward only to a lesser extent.

As a result, in one embodiment, the intermediate piece can advantageously bulge radially outward in a targeted or forced manner. Thus, in one embodiment, the intermediate piece can have a particularly advantageous stiffness profile.

In an alternative embodiment, the first radial lateral surface is a radially inner lateral surface, i.e., in particular bulges radially inward, and the second radial lateral surface is a radially outer lateral surface, which, in one embodiment, likewise bulges radially inward, is planar or bulges radially outward only to a lesser extent.

As a result, in one embodiment, the intermediate piece can advantageously bulge radially outward in a targeted or forced manner. Thus, in one embodiment, a sealing action can be improved.

In one embodiment, the first seal element is in the form of a hard sealing element and/or exhibits at least one thermoplastic, in particular PTFE, and can in particular consist thereof, in particular be cast therefrom.

In addition or alternatively, in one embodiment, the second seal element is in the form of a hard sealing element and/or exhibits at least one thermoplastic, in particular PTFE, and can in particular consist thereof, in particular be cast therefrom.

In addition or alternatively, the sealing element exhibits, in one embodiment, at least one elastomer, in one development EPDM, and in one embodiment can consist thereof, in particular be cast therefrom.

As a result, in one embodiment, the production, friction and/or sealing action can be improved in each case, in particular with at least two of these features in combination.

In one embodiment, the first and second sealing elements are movable with respect to one another in an axial direction, in particular guided against one another, and/or, in one embodiment, are secured captively together in a form-fitting manner.

As a result, in one embodiment, the function and/or assembly can be improved, in particular in combination with the elastically deformable intermediate piece.

In one embodiment, the intermediate piece, at least in an operating state of the seal arrangement, and in a development in which it is (already) in an assembled or assembly state, is braced elastically in an axial direction between or by the first and second walls.

As a result, in one embodiment, the sealing action can be improved.

In one embodiment, the first wall is adjoined radially on the inside and/or radially on the outside by an axial flange (of the first sealing element). In addition or alternatively, in one embodiment, the second wall is adjoined radially on the inside and/or radially on the outside by an axial flange (of the second sealing element).

Thus, in one embodiment, movement of the intermediate piece can be limited and thus in particular the elastic deformation thereof influenced, and thus, in one embodiment, the sealing action and/or the stiffness profile can be improved (further).

In one embodiment, the intermediate piece has a maximum axial length of at least 1.5 mm, in particular at least 2.5 mm, and/or at most 10 mm, in particular at most 5 mm. In addition or alternatively, in one embodiment, it has a maximum wall thickness between the first and second radial lateral surfaces of at least 0.35 mm, in particular at least 0.5 mm, and/or at most 5 mm, in particular at most 2 mm.

With such dimensions, the present invention can act in a particularly advantageous manner.

A seal arrangement according to the invention can be used particularly advantageously for sealing between a valve housing and an adjustable, in particular rotatable, valve body, in particular a valve body, arranged at least partially in the valve housing in an adjustable, in particular rotatable, manner, of a fluid valve, in particular of a multi-way and/or cooling-water control valve, in particular a multi-way and/or cooling-water regulating valve, and/or for or of a vehicle.

In one embodiment, a fluid valve is a fluid control valve, in one development a fluid regulating valve.

BRIEF DESCRIPTION OF THE DRAWINGS

The invention will be explained in detail in the following text with reference to the illustrations in the figures. Further advantageous developments of the invention can be gathered from the following description of preferred embodiments. To this end, in the partially schematic figures:

FIG. 1 shows a part of a fluid valve of a motor vehicle having a seal arrangement according to one embodiment of the present invention in axial section;

FIG. 2 shows the seal arrangement on its own in an exploded illustration,

DETAILED DESCRIPTION OF THE PRESENTLY PREFERRED EMBODIMENTS

Figure 3:
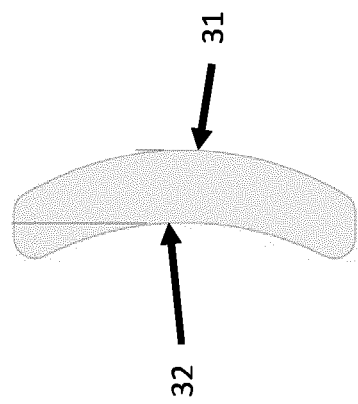
FIG. 3 shows a cross section through an intermediate piece of the seal arrangement.

FIG. 1 shows a part of a fluid valve of a motor vehicle having a seal arrangement according to one embodiment of the present invention in axial section.

The fluid valve has a valve housing 100 and a valve body 200, which is arranged in the housing 100 so as to be rotatable about an axis that is vertical in FIG. 1.

The seal arrangement has a ring-like first sealing element 10 for bearing in a sealing manner against the valve housing 100, a ring-like second sealing element 20 for bearing in a sealing manner against the valve body 200, and a ring-like, elastically deformable intermediate piece 30, which is braced in an axial direction (horizontal in FIG. 1) between a first wall 12, facing the second sealing element 20, of the first sealing element 10 and a second wall 21, facing the first sealing element 10, of the second sealing element 20, and elastically spaces apart the two sealing elements 10, 20.

An axial cross-section of the intermediate piece 30 has a radially outer, convex first lateral surface 31 and an opposite, or radially inner, second lateral surface 32, which is planar (cf. in particular FIG. 3).

Figure 4:
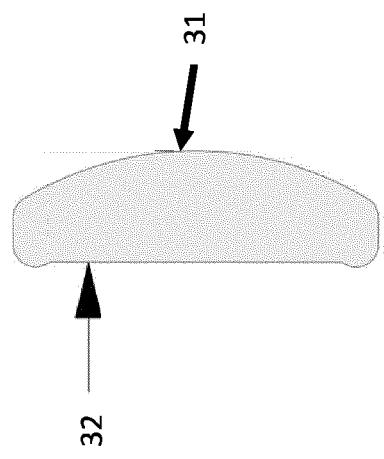
FIG. 4 shows a cross section through an intermediate piece of a seal arrangement according to a further embodiment of the present invention.

In a further embodiment of the present invention, shown in FIG. 4 and otherwise identical, this radially inner second lateral surface 32 is concave.

Thus, the intermediate piece 30 bulges radially outward in a targeted or forced manner when the first and second walls 12, 21 are moved axially toward one another. As a result, in addition to the elastic compression in the axial direction, an additional suspension functionality is realized and thus the stiffness profile of the intermediate piece 30, or of the seal arrangement, is improved.

The first and second seal elements 10, 20 are movable in an axial direction with respect to one another and guided against one another in a form-fitting manner and captively secured, as is apparent in FIG. 1.

The second wall 21 is radially adjoined on the inside and outside in each case by an axial flange 22 and 23, respectively, which advantageously influences a movement or a deformation of the intermediate piece 30.

Identical features or features having an identical effect are denoted by the same reference signs throughout the figures.

Although exemplary embodiments have been discussed in the above description, it should be noted that numerous modifications are possible. Furthermore, it should be noted that the exemplary embodiments are merely examples which are not intended to limit the scope of protection, applications and structure in any way. Rather, the above description will provide a person skilled in the art with a guideline for implementing at least one exemplary embodiment, wherein various modifications, in particular with regard to the function and arrangement of the described constituent parts, may be made without departing from the scope of protection as defined by the claims and by these equivalent combinations of features.

The invention claimed is:

1. A seal arrangement for a fluid valve, said seal arrangement having:
  a first sealing element (10) configured to bear in a sealing manner directly against a valve housing (100) of the fluid valve having a first axially extending portion that extends away from the valve housing;
  a second sealing element (20) configured to bear in a sealing manner directly against an adjustable, rotatable, valve body (200) of the fluid valve having a second axially extending portion that extends towards the valve housing; and
  an elastically deformable intermediate piece (30) arranged, in an axial direction, entirely between a first wall (12) of the first sealing element (10), the first wall (12) facing the second sealing element (20), and a second wall (21) of the second sealing element (20), the second wall (21) facing the first sealing element (10), so as to elastically space apart the first and second sealing elements (10, 20),
  wherein, in at least one axial portion of the intermediate piece (30), an axial cross section of the intermediate piece (30) has a first radial lateral surface (31) and an opposite second radial lateral surface (32), and wherein the first radial lateral surface (31) is convex and the second radial lateral surface (32) is concave, planar or less convex than the first radial lateral surface (31), wherein a portion of a radially outer face of the first axially extending portion faces a portion of a radially inner face of the second axially extending portion.

2. The seal arrangement as claimed in claim 1, wherein the first and/or second sealing element (10, 20) and/or the intermediate piece (30) is/are at least partially rotationally symmetric in a ring-like manner and/or with regard to an axis of symmetry parallel to the axial direction.

3. The seal arrangement as claimed in claim 1, wherein the first radial lateral surface (31) is a radially outer lateral surface and the second radial lateral surface (32) is a radially inner lateral surface.

4. The seal arrangement as claimed in claim 1, wherein the first and/or second seal element (10, 20) is/are in the form of a hard sealing element and/or exhibit(s) at least one thermoplastic and/or the intermediate piece (30) exhibits at least one elastomer.

5. The seal arrangement as claimed in claim 4, wherein the at least one thermoplastic is PTFE, and/or the at least one elastomer is EPDM.

6. The seal arrangement as claimed in claim 1, wherein:
a first edge of the first axially extending portion is in direct contact with the radially inner face of the second axially extending portion and
a second edge of the second axially extending portion is in direct contact with the radially outer face of the first axially extending portion.

7. The seal arrangement as claimed in claim 1, wherein the first and second seal elements (10, 20) are movable with respect to one another in the axial direction and/or are secured captively together in a form-fitting manner.

8. The seal arrangement as claimed in claim 1, wherein the intermediate piece (30) is elastically braced between the first and second walls (12, 21).

9. The seal arrangement as claimed in claim 1, wherein at least one of the first and second walls (12, 21) adjoins an axial flange (22, 23) radially on the inside and/or outside.

10. A fluid valve, in particular a multi-way and/or cooling-water control or regulating valve and/or for a vehicle, having at least one instance of a seal arrangement having:
a first sealing element (10) configured to bear in a sealing manner directly against a valve housing (100) of the fluid valve having a first axially extending portion that extends away from the valve housing;
a second sealing element (20) configured to bear in a sealing manner directly against an adjustable, rotatable, valve body (200) of the fluid valve having a second axially extending portion that extends towards the valve housing; and
an elastically deformable intermediate piece (30) arranged, in an axial direction, entirely between a first wall (12) of the first sealing element (10), the first wall (12) facing the second sealing element (20), and a second wall (21) of the second sealing element (20), the second wall (21) facing the first sealing element (10), so as to elastically space apart the first and second sealing elements (10, 20),
wherein, in at least one axial portion of the intermediate piece (30), an axial cross section of the intermediate piece (30) has a first radial lateral surface (31) and an opposite second radial lateral surface (32), and wherein the first radial lateral surface (31) is convex and the second radial lateral surface (32) is concave, planar or less convex than the first radial lateral surface (31), wherein a portion of a radially outer face of the first axially extending portion faces a portion of a radially inner face of the second axially extending portion, the seal arrangement configured to provide sealing between the valve housing (100) and the adjustable rotatable, valve body (200).

11. A vehicle having at least one fluid valve, having at least one instance of a seal arrangement having:
a first sealing element (10) configured to bear in a sealing manner directly against a valve housing (100) of the fluid valve having a first axially extending portion that extends away from the valve housing;
a second sealing element (20) configured to bear in a sealing manner directly against an adjustable, rotatable, valve body (200) of the fluid valve having a second axially extending portion that extends towards the valve housing; and
an elastically deformable intermediate piece (30) arranged, in an axial direction, entirely between a first wall (12) of the first sealing element (10), the first wall (12) facing the second sealing element (20), and a second wall (21) of the second sealing element (20), the second wall (21) facing the first sealing element (10), so as to elastically space apart the first and second sealing elements (10, 20),
wherein, in at least one axial portion of the intermediate piece (30), an axial cross section of the intermediate piece (30) has a first radial lateral surface (31) and an opposite second radial lateral surface (32), and
wherein the first radial lateral surface (31) is convex and the second radial lateral surface (32) is concave, planar or less convex than the first radial lateral surface (31),
wherein a portion of a radially outer face of the first axially extending portion faces a portion of a radially inner face of the second axially extending portion,
the seal arrangement configured to provide sealing between the valve housing (100) and the adjustable rotatable, valve body (200).

12. A method for providing sealing between a valve housing (100) and an adjustable, in particular rotatable, valve body (200) by, a seal arrangement for a fluid valve, said seal arrangement having: a first sealing element (10) configured to bear in a sealing manner directly against the valve housing (100) of the fluid valve having a first axially extending portion that extends away from the valve housing; a second sealing element (20) configured to bear in a sealing manner directly against the adjustable, rotatable, valve body (200) of the fluid valve having a second axially extending portion that extends towards the valve housing; and an elastically deformable intermediate piece (30) arranged, in an axial direction, entirely between a first wall (12) of the first sealing element (10), the first wall (12) facing the second sealing element (20), and a second wall (21) of the second sealing element (20), the second wall (21) facing the first sealing element (10), so as to elastically space apart the first and second sealing elements (10, 20), wherein, in at least one axial portion of the intermediate piece (30), an axial cross section of the intermediate piece (30) has a first radial lateral surface (31) and an opposite second radial lateral surface (32), and wherein the first radial lateral surface (31) is convex and the second radial lateral surface (32) is concave, planar or less convex than the first radial lateral surface (31), wherein a portion of a radially outer face of the first axially extending portion faces a portion of a radially inner face of the second axially extending portion, comprising arranging, by elastically bracing, the intermediate piece (30) between the first and second walls (12, 21).

\* \* \* \* \*